(12) United States Patent
Malik et al.

(10) Patent No.: US 7,558,287 B2
(45) Date of Patent: Jul. 7, 2009

(54) COMBINED HARDWARE AND SOFTWARE IMPLEMENTATION OF LINK CAPACITY ADJUSTMENT SCHEME (LCAS) IN SONET (SYNCHRONOUS OPTICAL NETWORK) VIRTUAL CONCATENATION (VCAT)

(75) Inventors: Rakesh Kumar Malik, New Delhi (IN); Dev Shankar Mukherjee, New Delhi (IN); Harsh Chilwal, Tallital (IN); Dinesh Gupta, New Delhi (IN)

(73) Assignee: Transwitch Corporation, Shelton, CT (US)

( * ) Notice: Subject to any disclaimer, the term of this patent is extended or adjusted under 35 U.S.C. 154(b) by 360 days.

(21) Appl. No.: 11/210,135

(22) Filed: Aug. 23, 2005

(65) Prior Publication Data

US 2007/0047594 A1 Mar. 1, 2007

(51) Int. Cl.
*H04L 12/28* (2006.01)
*H04J 3/16* (2006.01)
(52) U.S. Cl. .................. 370/468; 370/395.21; 370/412
(58) Field of Classification Search ................ 370/516, 370/535, 907, 538, 541, 543, 544, 466, 465, 370/468, 395.21, 395.41, 230, 358; 709/230, 709/246, 249
See application file for complete search history.

(56) References Cited

U.S. PATENT DOCUMENTS

| | | | | |
|---|---|---|---|---|
| 6,996,125 | B2 * | 2/2006 | Kfir et al. ................... | 370/466 |
| 7,058,008 | B1 * | 6/2006 | Wilson et al. ............... | 370/216 |
| 7,305,013 | B2 * | 12/2007 | Kfir et al. ................... | 370/516 |
| 2005/0073955 | A1 * | 4/2005 | MacLean et al. ............ | 370/235 |
| 2006/0008324 | A1 * | 1/2006 | Metrock ...................... | 404/118 |
| 2006/0120278 | A1 * | 6/2006 | Lim et al. .................... | 370/218 |
| 2006/0126641 | A1 * | 6/2006 | Song et al. ............. | 370/395.51 |

OTHER PUBLICATIONS

Benefits and implementation of VC/VCAS in an Ethernet over SONET/SDH line card by Sherman.*
Alan Sherman; benefits and Implementation of VC/LCAS in an Ethernet over SONET/SDH linecard, May 2004, pp. 1-7.*
"Benefits and Implementationof VC/LCAS in an Ethernet over SONET/SDH Line Card," Alan Sherman, Fotis Konstantinidis, Vitesse Semiconductor Corporation, May, 2004, 7 pages.
IEEE STD 802.3 (2005), Part 3, Carrier sense multiple access with collision detection (CSMA/CD) access method and physical layer specifications (Sections 1-5).
ITUT-T Rec. G707/Y.1322 Network node interface for the Synchronous Digital Hierarchy (SDH) International Telecommunication Union (Dec. 2003).
ITU-T Rec. G.7042/Y.1305 Link capacity adjustment scheme (LCAS) for virtual concatenated signals, International Telecommunication Union (Feb. 2004).

* cited by examiner

*Primary Examiner*—Hanh Nguyen
(74) *Attorney, Agent, or Firm*—Gordon & Jacobson, PC

(57) ABSTRACT

Combined hardware and software processing is applied in an end node of the network which includes mapping/demapping and deskewing. Most of the LCAS procedure is implemented in software so that it can be modified easily. Some of the procedure is implemented in hardware to meet stringent timing requirements. In particular, the handshaking protocol is implemented in software and the procedure for actually changing of the link capacity in response to the handshaking is implemented in hardware. The hardware and software communicate via a shared memory which includes a receive packet FIFO, receive control and status registers, a transmit packet FIFO, transmit control and status registers, and a transmit time slot interchange table.

12 Claims, 6 Drawing Sheets

FIGURE . Components of the HW part of the partition

| | | | | | | | |
|---|---|---|---|---|---|---|---|
| Word(0) | H4[7:4]15 | H4[7:4]14 | H4[7:4]13 | H4[7:4]12 | H4[7:4]11 | H4[7:4]10 | H4[7:4]9 | H4[7:4]8 |
| Word(1) | H4[7:4]7 | H4[7:4]6 | H4[7:4]5 | H4[7:4]4 | H4[7:4]3 | H4[7:4]2 | H4[7:4]1 | H4[7:4]0 |
| Word(2) | Member Status/Control Information (as in the Table 2) | | | | | | | |

*FIG. 4*

| | | | | | | | |
|---|---|---|---|---|---|---|---|
| Word(0) | H4[7:4]15 | H4[7:4]14 | H4[7:4]13 | H4[7:4]12 | H4[7:4]11 | H4[7:4]10 | H4[7:4]9 | H4[7:4]8 |
| Word(1) | H4[7:4]7 | H4[7:4]6 | H4[7:4]5 | H4[7:4]4 | H4[7:4]3 | H4[7:4]2 | H4[7:4]1 | H4[7:4]0 |

*FIG. 5*

COMBINED HARDWARE AND SOFTWARE IMPLEMENTATION OF LINK CAPACITY ADJUSTMENT SCHEME (LCAS) IN SONET (SYNCHRONOUS OPTICAL NETWORK) VIRTUAL CONCATENATION (VCAT)

CROSS-REFERENCE TO RELATED APPLICATIONS

This application is related to co-owned Ser. No. 11/210,127 entitled "Methods and Apparatus for Deskewing VCAT/LCAS Members", filed concurrently herewith, the complete disclosure of which is hereby incorporated herein by reference.

BACKGROUND OF THE INVENTION

1. Field of the Invention

This invention relates broadly to telecommunications, the Synchronous Optical Network (SONET) and the Synchronous Digital Hierarchy (SDH). More particularly, this invention relates to a combined hardware and software implementation of the link capacity adjustment scheme (LCAS) in SONET/SDH virtual concatenation (VCAT).

2. State of the Art

The Synchronous Optical Network (SONET) or the Synchronous Digital Hierarchy (SDH), as it is known in Europe, is a common telecommunications transport scheme which is designed to accommodate both DS-1 (T1) and E1 traffic as well as multiples (DS-3 and E-3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec. The frame includes the synchronous payload envelope (SPE) or virtual container (VC) as it is known in Europe, as well as transport overhead. Transport overhead is contained in the first three columns (27 bytes) and the SPE/VC occupies the remaining 87 columns.

In Europe, the base (STM-1) rate is 155.520 Mbit/sec, equivalent to the North American STS-3 rate (3*51.84=155.520). The STS-3 (STM-1) signals can accommodate 3 DS-3 signals or 63 E1 signals or 84 DS-1 signals, or a combination of them. The STS-12 (STM-4) signals are 622.080 Mbps and can accommodate 12 DS-3 signals, etc. The STS-48 (STM-16) signals are 2,488.320 Mbps and can accommodate 48 DS-3 signals, etc. The highest defined STS signal, the STS-768 (STM-256), is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

To facilitate the transport of lower-rate digital signals, the SONET standard uses sub-STS payload mappings, referred to as Virtual Tributary (VT) structures. (The ITU calls these structures Tributary Units or TUs.) This mapping divides the SPE (VC) frame into seven equal-sized sub-frames or VT (TU) groups with twelve columns of nine rows (108 bytes) in each. Four virtual tributary sizes are defined as follows.

VT1.5 has a data transmission rate of 1.728 Mb/s and accommodates a DS1 signal with overhead. The VT1.5 tributary occupies three columns of nine rows, i.e. 27 bytes. Thus, each VT Group can accommodate four VT1.5 tributaries.

VT2 has a data transmission rate of 2.304 Mb/s and accommodates a CEPT-1 (E1) signal with overhead. The VT2 tributary occupies four columns of nine rows, i.e. 36 bytes. Thus, each VT Group can accommodate three VT2 tributaries.

VT3 has a data transmission rate of 3.456 Mb/s) and accommodates a DS1C (T2) signal with overhead. The VT3 tributary occupies six columns of nine rows, i.e. 54 bytes. Thus, each VT Group can accommodate two VT3 tributaries.

VT6 has a data transmission rate of 6.912 Mb/s and accommodates a DS2 signal with overhead. The VT6 tributary occupies twelve columns of nine rows, i.e. 108 bytes. Thus, each VT Group can accommodate one VT6 tributary.

As those skilled in the art will appreciate, the original SONET/SDH scheme as well as the VT mapping schemes were designed to carry known and potentially foreseeable TDM (time division multiplexed) signals. In the early 1980s these TDM signals were essentially multiplexed telephone lines, each having the (now considered) relatively small bandwidth of 56-64 kbps. At that time, there was no real standard for data communication. There were many different schemes for local area networking and the wide area network which eventually became known as the Internet was based on a "56 kbps backbone". Since then, Ethernet has become the standard for local area networking. Today Ethernet is available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae).

In recent years it has been recognized that SONET/SDH is the most practical way to link high speed Ethernet networks over a wide area. Unfortunately, the various Ethernet transmission rates (10 Mbps, 100 Mbps, 1,000 Mbps, and 10,000 Mbps) do not map well into the SONET/SDH frame. For example, the original 10 Mbps Ethernet signal is too large for a VT-6 tributary (6.912 Mbps) but too small for an entire STS-1 (51.84 Mbps) path. In other words, under the existing SONET/SDH schemes, in order to transport a 10 Mbps Ethernet signal, an entire STS-1 path must be used, thereby wasting a significant amount of bandwidth. Similar results occur when attempting to map the faster Ethernet signals into STS signals.

In order to provide a scheme for efficiently mapping Ethernet signals (as well as other signals such as Fiber Channel and ESCON) into a SONET/SDH frame, the Virtual Concatenation (VCAT) Protocol was created and has been endorsed by the ITU as the G.707 standard (ITUT-T Rec. G.707/Y.1322 (December 2003)) which is hereby incorporated by reference herein in its entirety. Similar to inverse multiplexing, Virtual Concatenation combines multiple links (members) into one Virtual Concatenation Group (VCG), enabling the carrier to optimize the SDH/SONET links for Ethernet traffic. For example, using virtual concatenation, five VT-2 (2 Mbps) links can be combined to carry a 10 Mbps Ethernet signal, resulting in full utilization of allotted bandwidth. Two STS-1 (51 Mbps) links can be combined to carry a 100 Mbps Ethernet signal, etc. Virtual Concatenation uses SONET/SDH overhead bytes to indicate a control packet. In the source to sink direction, the control packet includes: multiframe indicator (MFI), sequence number (SQ), control field (CTRL), and group identification bit (GID). MFI is actually presented in two parts (MFI-1 and MFI-2). CTRL includes information to synchronize sink to source and to provide the status of an individual group member.

Part of the emerging Virtual Concatenation Protocol includes methods for dynamically scaling the available bandwidth in a SONET/SDH signal. These methods are known as the Link Capacity Adjustment Scheme or LCAS. LCAS is a powerful network management tool because customer bandwidth requirements change over time. One simple example is a network user who, during business hours, needs only enough bandwidth to support electronic mail and worldwide web access. During non-working hours, however, the same network user may wish to conduct relatively large data transfers from one location to another to backup daily transactions, for example. It would be desirable to alter the user's available bandwidth as needed. LCAS provides a means to do this without disturbing other traffic on the link. LCAS has been endorsed by the ITU as the G.7042 standard (ITU-T Rec. G.7042/Y.1305 (February 2004)) which is hereby incorporated by reference herein in its entirety.

While Virtual Concatenation is a simple labeling protocol, LCAS requires a two-way handshake (using seven of the sixteen H4 bytes for high order STS-1 signals, and seventeen of the thirty-two K4 bits for low order VT1.5 signals). Status messages are continually exchanged and actions are taken based on the content of the messages. For example, to provide high order (STS-1) virtual concatenation, each STS-1 signal carries one of six LCAS control commands which are described as follows:

"Fixed"—LCAS not supported on this STS-1;
"Add"—Request to add this STS-1 to a VCG, thereby increasing the bandwidth of an existing VCG or creating a new VCG;
"Norm"—This STS-1 is in use;
"EOS"—This STS-1 is in use and is the last STS-1 of this VCG, i.e. the payload carrying STS-1 with the highest SQ number;
"Idle"—This STS-1 is not part of a VCG or is about to be removed from a VCG; and
"Do not use"—This STS-1 is supposed to be part of a VCG, but does not transport payload due to a broken link reported by the destination. Members of a VCG which do not carry payload are termed "inactive" whereas members which carry payload are termed "active".

The handshaking protocol of the LCAS standard can be relatively slow and is not subject to stringent timing requirements. Once the handshaking is complete, however, the mapper device at the end node must add or remove one or more members from the affected VCG before the start of the next frame. It is not difficult to implement LCAS in hardware in order to meet this stringent timing requirement. However, LCAS is still an evolving protocol and it is difficult or impossible to alter the hardware in order to adapt to changes in the LCAS protocol. Moreover, the implementation of additional alarm and monitoring features is impossible if the implementation is entirely hardware.

SUMMARY OF THE INVENTION

It is therefore an object of the invention to provide an implementation of the LCAS protocol that meets its stringent timing requirements.

It is another object of the invention to provide an implementation of the LCAS protocol that can be easily modified to adapt to changes in the protocol.

In accord with these objects, which will be discussed in detail below, the invention is applied in an end node of the network which includes mapping/demapping and deskewing. Most of the LCAS procedure is implemented in software so that it can be modified easily should the standard be changed or should additional alarm and monitoring features be desired at a later date. Some of the procedure is implemented in hardware to meet the stringent timing requirements. In particular, the handshaking protocol is implemented in software and the procedure for actually changing of the link capacity in response to the handshaking is implemented in hardware. The hardware and software communicate via a shared memory which includes a receive packet FIFO, receive control and status registers, a transmit packet FIFO, transmit control and status registers, and a transmit time slot interchange table.

The processing cycle is aligned with transmit side LCAS packet insertion (time slot interchange) in the data path. In the transmit direction, where the device acts as a data source, timing for all the channels is identical. Using this timing to define the new packet marker (NewPktMarker) for the LCAS processing cycle simplifies the HW-SW sync up process.

In the receive direction, where the device acts as a data sink, LCAS packets become available at different instants. They are pushed into the receive FIFO by the hardware and their arrival is not required to be aligned with the NewPktMarker (or with other channels in the receive direction). The software reads the packets from the receive FIFO and processes them for LCAS. In the transmit direction, the software writes the LCAS packets into the hardware after syncing up with the MFI2 (to align the member status for different members). The hardware inserts the packets into the data path. The entire cycle is performed in 2 ms (16 frames).

Timing critical tasks, i.e. increasing or decreasing the bandwidth at the correct frame boundaries, is carried out by hardware based on control signals either received from the incoming frame or read from a register written by the software.

Additional objects and advantages of the invention will become apparent to those skilled in the art upon reference to the detailed description taken in conjunction with the provided figures.

BRIEF DESCRIPTION OF THE DRAWINGS

FIG. 4 is a tabular representation of the three word receive side LCAS control packet;

FIG. 5 is a tabular representation of the two word transmit side LCAS control packet;

DETAILED DESCRIPTION OF THE PREFERRED EMBODIMENT

Figure 1:
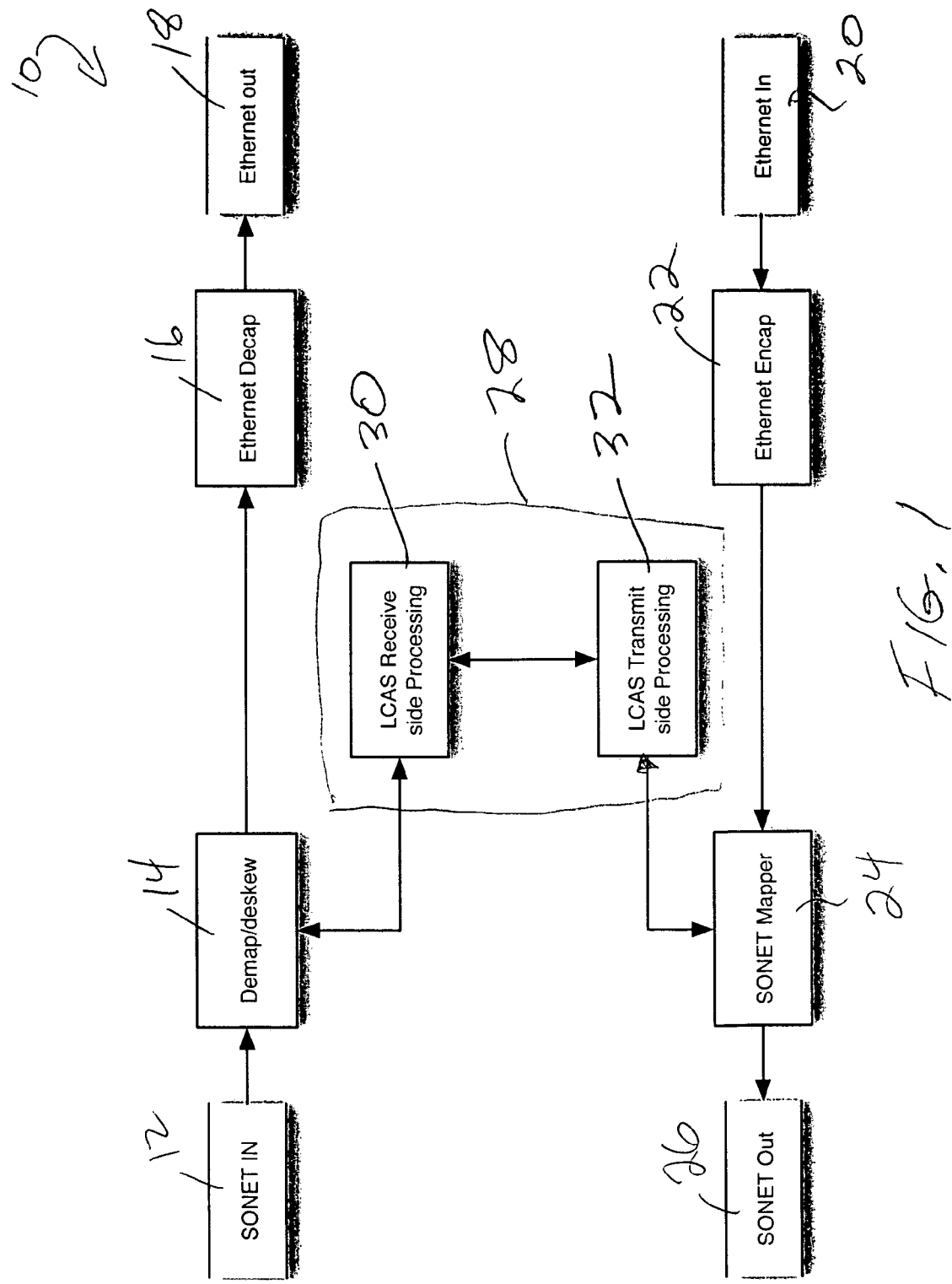
FIG. 1 is a high level block diagram of a SONET PHY layer device incorporating the hardware and software of the invention.

Turning now to FIG. 1, a SONET PHY layer device 10 receives a SONET signal at 12, deskews and demaps the signal at 14, decapsulates Ethernet packets at 16 and outputs Ethernet packets at 18. In the transmit direction, the device 10 receives Ethernet packets at 20, encapsulates them at 22 and maps them into SONET frames at 24 to output a SONET signal at 26. According to the invention, the PHY layer device 10 is provided with means for virtual concatenation (VCAT) with link capacity adjustment scheme (LCAS) at 28. For easier understanding of the processes, they are illustrated here as separate receive side processing 30 and transmit side processing 32, although the receive and transmit processing are tightly integrated. Generally speaking, the receive side processing 30 communicates with the demapper 14 and passes results to the transmit side processing 32 which communicates with the mapper 24.

Figure 2:
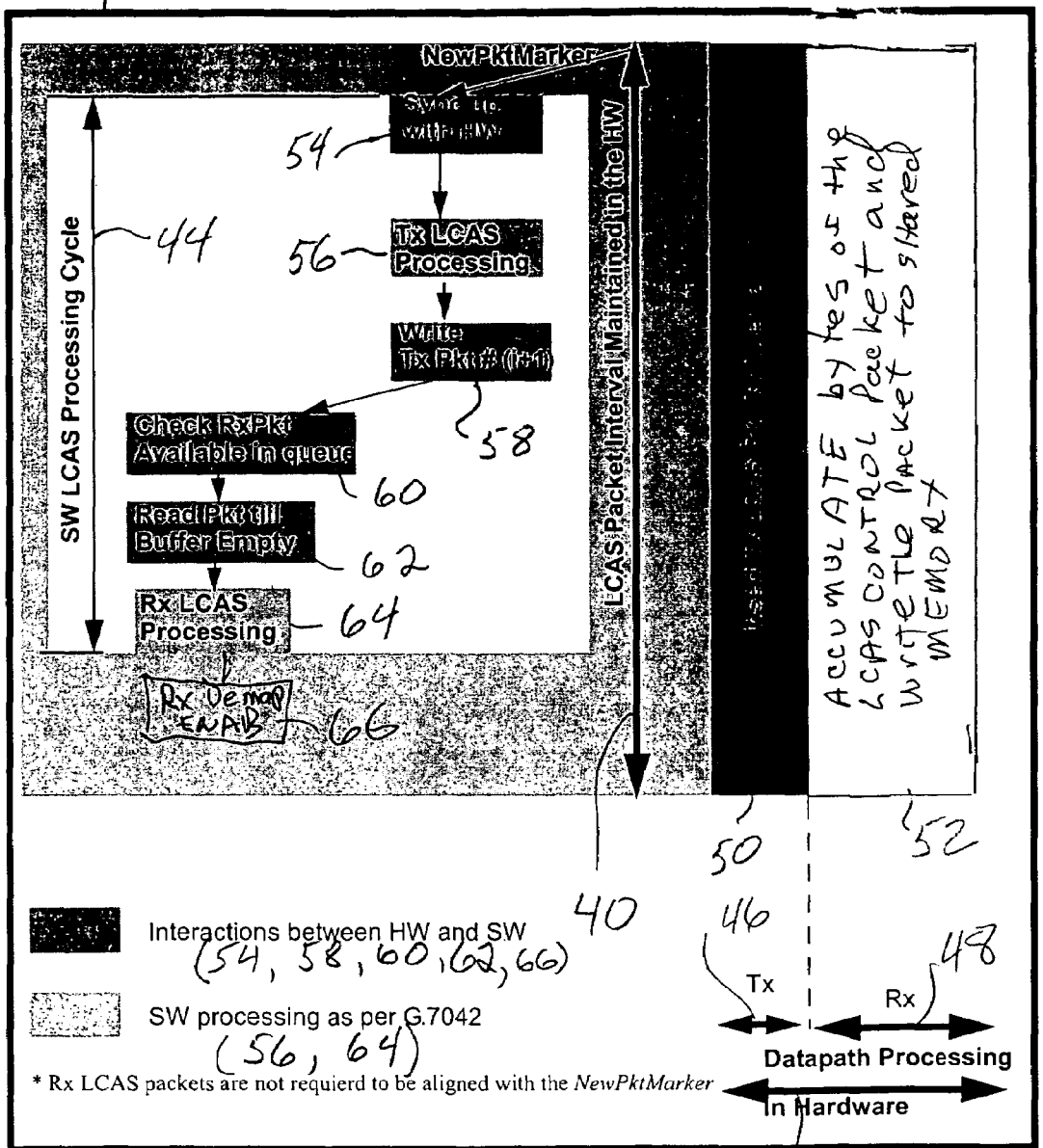
FIG. 2 is a high level block diagram illustrating the division of LCAS processing tasks between hardware and software during the 2 ms interval.

FIG. 2 illustrates in a very schematic manner, the division of processes between software and hardware in the LCAS processing block 28 according to the invention. All processing for a given control packet is completed in a 2 ms interval which is illustrated at 40 in FIG. 2. This interval is maintained by hardware as indicated at 42. The software processing cycle (illustrated to the left of the interval marker 40) is less than 2 ms as illustrated at 44 but is pipelined as described below. Transmit and receive hardware functions are schematically divided at 46 and 48 respectively. Generally speaking, the transmit process 50 of hardware is to read an LCAS packet from shared memory and insert the LCAS packet into the outgoing SONET stream. In the receive direction, the process 52 of hardware accumulates bytes of the LCAS control packet and writes the packet to shared memory.

FIG. 2 illustrates the LCAS processing transmit side first, followed by receive side. Although this may seem counterintuitive, it is actually easier to appreciate the processes when explained in this order. The actual implementation can be arranged to synchronize either on transmit or receive processing. When synchronized on transmit processing, the first iteration is trivial because the LCAS control packet is simply a default packet which is loaded on startup. The remainder of FIG. 2 shows software processes and hardware-software interactions in a very high level manner. At 54 the software synchronizes to the hardware NewPKtMarker either through polling or an interrupt. The transmit side LCAS processing occurs at 56 performed solely by software, terminating in a writing of the LCAS packet into shared memory at 58 where it is read by the hardware. The receive side LCAS processing starts at 60 where the software looks at the shared memory to see if a received LCAS packet is available having been written there by hardware. Assuming that a packet is in memory, it is read out by the software at 62 and is processed in software at 64 pursuant to the above described G.7042 standard and the RxDemap Enable bit is set at 66. According to the presently preferred embodiment, the hardware is implemented in standard cell logic (gates, flipflops and random access memories); and the software is implemented in C and runs on a small kernel on an Xtensa processor using standard cell logic on the same die. The C is compiled and assembled to object code which is downloaded to the Xtensa processor's instruction memory through a Host Interface (FIG. 3, software interface).

In addition to the choice of synchronizing on transmit or receive, the LCAS processing of the invention can be operated in either interrupt mode or polling mode. In the Interrupt mode, software needs to process only a single interrupt. In the polling mode, a single status bit needs to be checked for software to decide the start of a new LCAS processing cycle. Polling mode has the advantage of simplicity of implementation. However, an example of interrupt mode usage can be, but not restricted to, the following: If high LCAS protocol performance is desired, all the processing must be completed before the next NewPktMarker. If the other tasks in SW are such that fine polling granularity is not possible, it may so happen that the start of the LCAS processing cycle is delayed. This may result in the processing cycle not getting completed before the next NewPktMarker (even if the LCAS part of the SW is designed to take much less than 2 ms for processing). In such a scenario, using the interrupt mode would be a better option).

As alluded to above, the LCAS control packet does not arrive at a single instant, but is accumulated over time (2 ms). Thus, processing a received packet occurs during the next 2 ms interval after the entire packet was received. In normal operation, the control packet can be assembled and processed within the 2 ms window.

Figure 3:
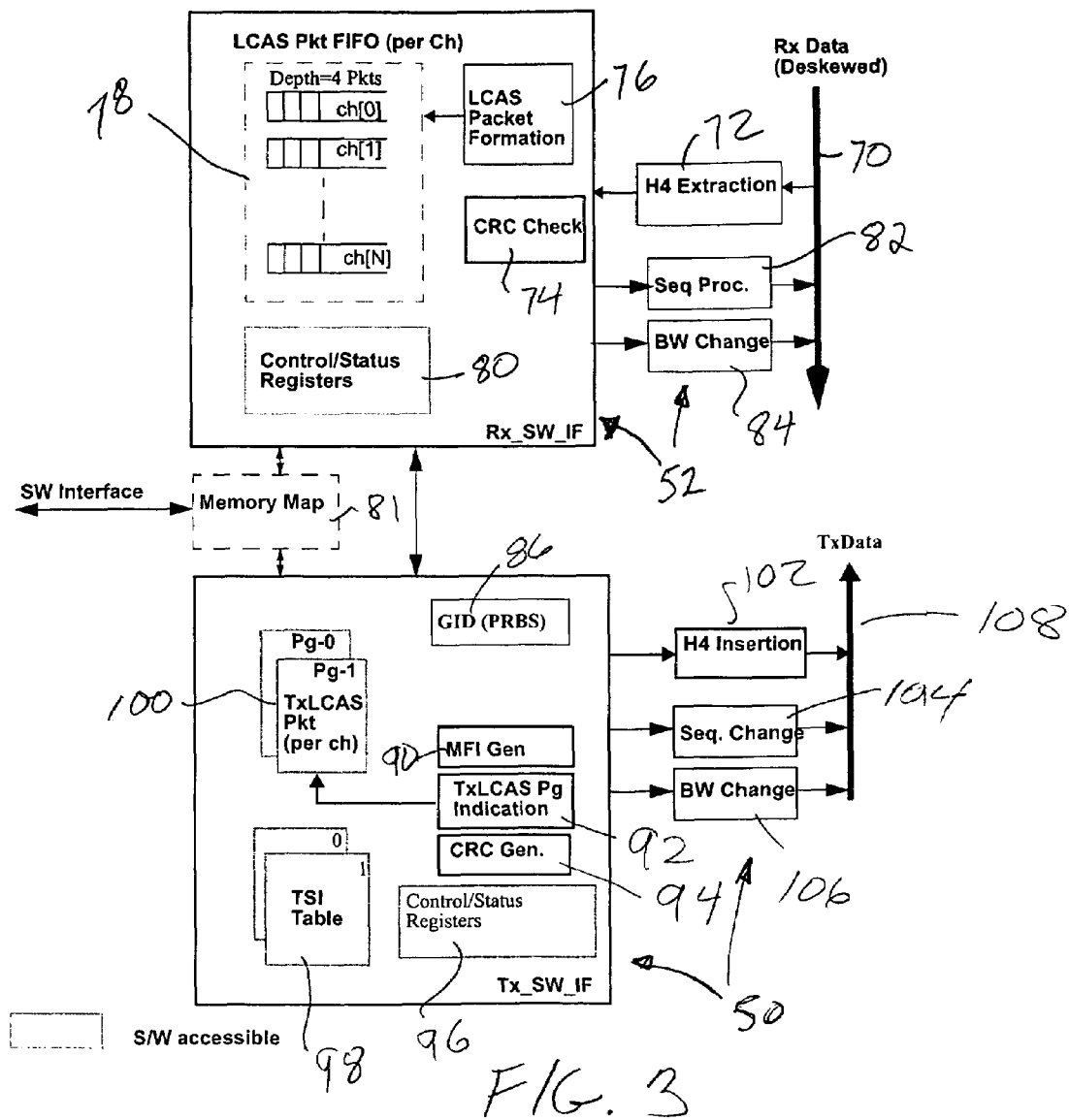
FIG. 3 is a high level block diagram illustrating the hardware components including the shared memory through which the hardware and software components communicate.

Turning now to FIG. 3, the operations of the hardware processing are illustrated in somewhat more detail. The hardware receive processing 52 receives deskewed data 70 from the demapper (14 in FIG. 1) and extracts H4 bytes at 72. According to the preferred embodiment, the hardware performs the CRC check 74 on the receive side 52. LCAS packets are formed at 76 by writing the bytes to a FIFO 78 which is N channels long and 4 packets deep. The 4 packet depth allows a 4 packet pipeline process. In addition to writing the control packets to the FIFO 78, the hardware writes data to control and status registers 80 (described in more detail below with reference to Table 1). The contents of the FIFO 78 and the registers 80 are readable by the software via a memory map 81. Sequence procedure and bandwidth change information generated locally through the control plane (not shown) are sent to the output of the demapper at 82 and 84, respectfully.

On the transmit side 50, the hardware generates the GID (group ID) bit using a PRBS (pseudo-random bit sequence) generator 86. According to the presently preferred embodiment, there is a configuration option in the hardware to use the GID bit written by the software. The hardware 50 reads at 100 the LCAS packet generated by the software, generates the MFI1 at 90, and reads the MFI2 from the registers 96. After the LCAS packet is read, the TxSwitch Packet bit is set at 92 to toggle the read and write pages 100. This is explained in greater detail below with reference to FIG. 6. The hardware performs sequence processing based on the time slot interchange tables 98 and generates packet CRC at 94. According to the presently preferred embodiment, there is a configuration option in the hardware to use the CRC written by the software into the registers 96. The LCAS packet is inserted at 102 into the outgoing data stream 108. Sequence processing is done by the hardware at 104 based on which members are active (carrying data) and need to be aligned per their sequence numbers. Bandwidth change information is extracted by the hardware from the receive data by checking which member is carrying CTRL=NORM/EOS. The hardware then orders the data going to Demapper as per the Sequence numbers and asserts member valid indications to Demapper, effecting bandwidth changes as noted at 106.

Table 1 illustrates the contents of the shared memory (shown in FIG. 2 at 78, 80, 96, 98, and 100) which acts as the hardware-software interface. In Table 1, hardware is abbreviated HW and software is abbreviated SW. Generally, the memory is described in five categories: the receive packet FIFO, the receive control and status registers, the transmit packet FIFO, the transmit TSI table, and the transmit control and status registers. It should be noted that some of the FIFOs and registers are provided "per channel". A channel is a VCG member or potential member. Others are provided "globally", i.e. used in processing all channels. Still others are provided "per VCG". The "read/write accessibility" shown in Table 1 refers to software accessibility.

TABLE 1

| Register Name | Type-1 | Accessibility | Width in bits | Usage/Description |
|---|---|---|---|---|
| RX Packet FIFO | | | | |
| Rx_LCAS_Pkt[0:2] | Per Channel | Read only. | 32 | Layout of the Rx side LCAS Control Packet is as shown in FIG. 4 and Table 2, "Rx side LCAS Control Packet layout for Word(2)". Packets are written by the HW into a FIFO and read by SW at this address. [0]: For the first word in the LCAS packet [1]: For the second word [2]: For the third word These Control packets are stored in a FIFO of depth 4. The HW maintains the read pointer of the FIFO. Hardware would treat access to the third word to mean "ReadComplete" for that packet and move the read pointer to the next packet. |
| RX Control and Status Registers | | | | |
| Rx_PktAvailable | global | Read only. | 48 | A 48-bit vector indicating for which members LCAS packets are availabe. Register-1: [31:0] = For member numbers (31-0) Register-2: [15:0] = For member numbers (47-32) The register gets cleared when no more than 1 complete Rx LCAS Control packets are available for the LCAS processor, for that channel. |
| Rx_Overflow_error | global | Clear-On-Read | 48 | A 48-bit vector indicating that SW reads for that member have not kept pace with the incoming LCAS packet rate. Register-1: [31:0] = For member numbers (31-0) Register-2: [15:0] = For member numbers (47-32) ORed status may be used as an interrupt to Processor(depending on the corresponding Mask settings) It is cleared when SW reads it. |
| Rx_OverflowErrCount | Per Channel | Clear-On-Read | 8 | Indicates the number of times as LCAS packet had to be dropped for a channel because of slow reads from LCAS processor. (saturating type counter) |
| Rx_PktAvailableMask | Per Channel | Read/Write | 1 | Masks corresponding to Rx_PktAvalaibleStatus register. Default is all 1's (i.e. interrupts due to bits in Rx_PktAvailableStatus register disabled) |
| Rx_OverflowErrMask | Per Channel | Read/Write | 1 | Masks corresponding to Rx_OverflowErrMask register. Default is all 1's (i.e. Interrupt masked off) |
| Rx_DeskewEnable | global | Read/Write | 24 | Deskew enable/disable bit on a VCG basis (Debug feature) |
| Rx_DemapEnable | Per Channel | Read/Write | 1 | Flag indicating that MST-OK signaling has been sent to the Far end node and therefore Rx side HW should start looking for LCAS CTRL word to man-age the bandwidth signaling to Demapper. This bit is de asserted when MST-FAIL signaling has been sent to the Far end node. |
| Rx_PktAdrReset | global | Read/Write | 24 | When '1', the Read/Write Pointers to the LCAS Packet (maintained in the HW) for all the members in the corresponding VCG are set to their default value. |
| TX Packet | | | | |
| Tx_LCAS_Pkt | Per ch | Read/Write | 32 | LCAS packet on the transmit side written by SW. SW writes 2-words per packet for a member. The two words carry 16-nibbles corresponding to H4[7:4] as per the format in Table2 (for Word-1 and 2) |

TABLE 1-continued

| Register Name | Type-1 | Accessibility | Width in bits | Usage/Description |
|---|---|---|---|---|
| Tx TSI Table | | | | |
| Tx_TSI_Table | Per channel | Read Write | 6 | This is a table used to align the contiguous data from the Mapper according to the Sequence number. |
| TX Control and Status Registers | | | | |
| Tx_2msINT (NewPktMarker) | global | Clear-On-Read | 1 | Demarcation of 2 ms boundary. May be polled or used as an interrupt to Processor (depending on the corresponding mask setting) |
| Tx_2msINT_Mask | global | Read/Write | 1 | Mask bit for Tx_2msINT to Processor. Default is '1' (Interrupt disabled) |
| Tx_MFI2 | global | Read Only | 8 | Contains the MFI2 for which the SW has to write the packet. SW is expected to read this register at the start of a 2-ms interval (as indicated by Tx_2msINT) and then write MST status in the Tx_LCAS_Pkt accordingly. |
| Tx_SwitchTSI | Per VCG | Read/Write | 1 | SW sets it when it updates the TSI Table. This is an indication to the HW to make the TSI table written by the SW as the working TSI table. Tx_SwitchTSI bit is reset by the HW once the swap action has been performed by the HW. |
| Tx_Switch_Packet | Per VCG | Read/Write | 1 | This indicating that packet Write is complete all members of a VCG by the SW. Bit corresponding to a member gets cleared when the HW asserts Tx_2msINT. |
| Tx_PktWrErr | Per VCG | Clear-On-Read | 24 | This error is set by the HW when the SW is unable to write a new control packet before the next New-PacketMarker. In such a case, the HW does not switch control packet page and sends the old LCAS packet for the members of that VCG, but with CRC corrupted so that no inconsistencies are introduced in the LCAS protocol. ORed status may be used as an interrupt to Processor(depending on the corresponding Mask settings) |
| Tx_PktWrErrCount | Per Ch | Clear-On-Read | 8 | Indicates the number of times Tx_PktWrErr occurred for a particular channel since the last read. |

FIG. 4 illustrates the receive side LCAS control packet which is arranged as three words. The first two words are nibbles of H4 bytes. The designation "[7:4]" indicates the upper nibble which includes bits 7 through 4. The subscripts 0-15 indicate the sixteen multiframes defined by the G.707 standard. The content of the first two words is as follows:

SQ (Sequence Indicator) field is two H4 nibbles of the 1$^{st}$ multiframe #14 and #15;

The H4 nibbles #11-#13 are reserved;

RS-Ack (Re-Sequence Acknowledge) bit is bit 4 of the H4 nibble of the 1$^{st}$ multiframe #10;

MST (Member status) field is two nibbles of the 1$^{st}$ multiframe #8 and #9;

CRC-8 field is two H4 nibbles of the 1$^{st}$ multiframe #6 and #7;

H4 nibbles #4 and #5 are reserved;

GID (Group Identification) bit is bit 4 of the H4 nibble of the 1$^{st}$ multiframe #3;

CTRL (Control) field is one H4 nibble of the 1$^{st}$ multiframe #2; and

MFI (2nd Multiframe Indicator) is two H4 nibbles of the 1$^{st}$ multiframe #0 and #1.

Only the upper nibble, H4[7:4], is exchanged between the hardware and SW. The lower nibble, H4[3:0], which indicates the MFI1, is implied by the position where the H4[7:4] nibble is stored (as indicated by the subscript in the Figure). In other words, the MFI1 cycles from 0-15 after which the MFI2 is incremented. Thus when the MFI2 is seen to change, the MFI1 is zero.

The third word "Word(2)" of the receive side LCAS control packet carries the configuration and status of the member associated with the control packet. The fields of Word(2) are set forth in Table 2.

TABLE 2

| Word | Description |
|---|---|
| Word(2) | Carries the configuration of that member as well as the status of the current packet: [3:0]: Reserved [4]: Packet CRC Status (1: CRC OK; 0: CRC Fail) [5]: RLOA (1: LOA Alarm; 0: No LOA Alarm) [6]: Server FAIL Indication [7:10]: Reserved [11]: RADDFAILENB (enable detection of fail in addition) [12]: RSQMLCASENB (indicates whether sequence mismatch detection by f/w for that member is enabled/disabled) [13]: RGIDENB (indicates whether GID bit comparison(by f/w across the group is enabled/disabled) [14]: RMremove (REMOVE command from the Host) [15]: RMadd (ADD command from the Host) |

TABLE 2-continued

| Word | Description |
|---|---|
| | [16]: RLCASEN (to indicate if the member is LCAS enabled or not)<br>[17:21]: RETURNPATH (ID of the transmit side VCG for which this member is the return path. There can be multiple members with the same RETURNPATH value) |

The LCAS transmit control packet format is shown in FIG. 5 and is substantially the same as the first two words of the control packet.

Figure 6:
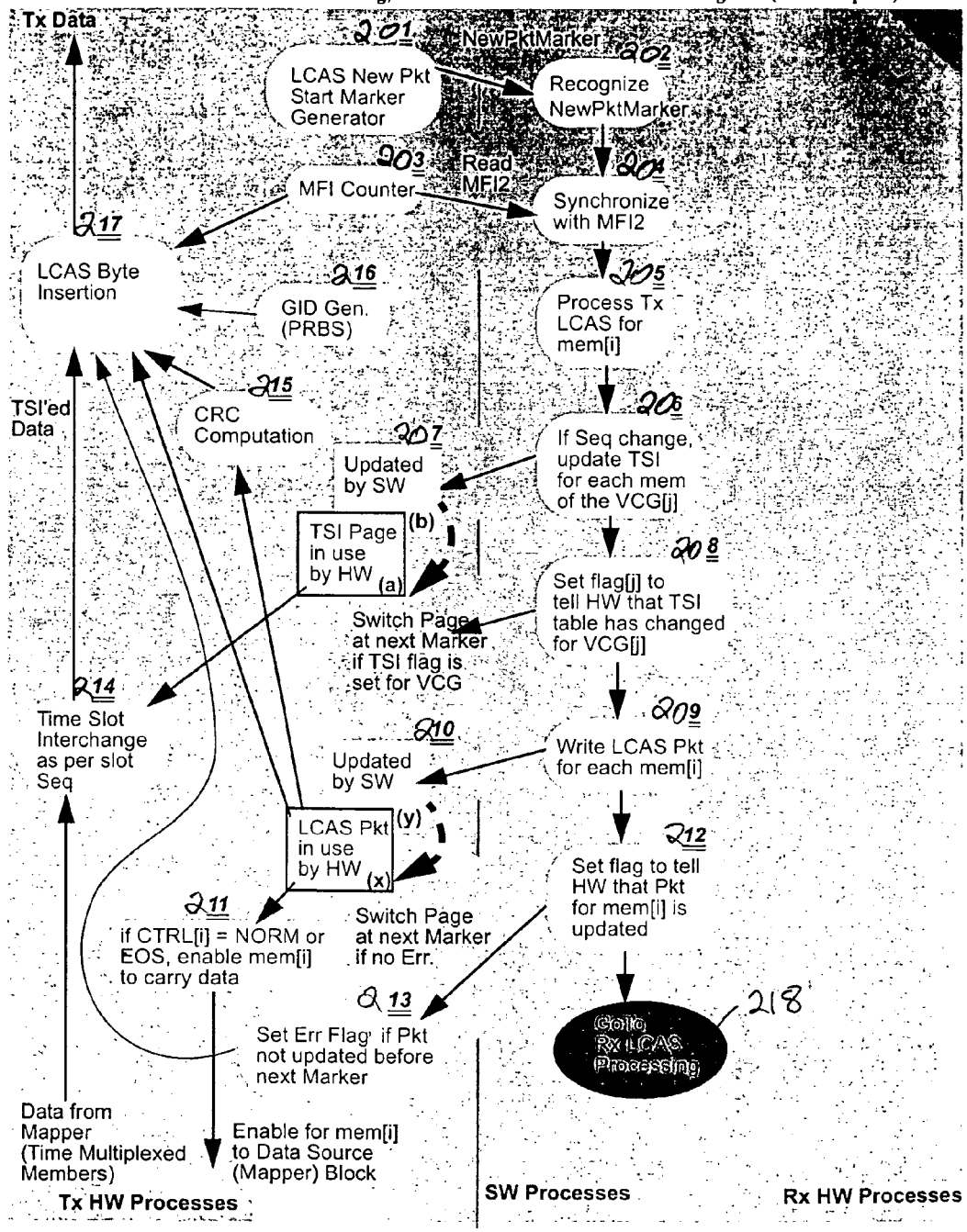
FIG. 6 is a high level flow chart illustrating the concurrent processes performed by hardware and software on the SONET transmit side of the SONET PHY layer device.

Turning now to FIG. 6, concurrent hardware and software transmit packet processing steps are illustrated in order with the transmit hardware processes on the left and the software processes on the right. The process starts with the hardware process of generating the new packet marker (NewPkt-Marker) at 201 and the software recognizing the new packet marker at 202 (54 in FIG. 2). According to the presently preferred embodiment, the marker signal goes high at the start of frame signal of the frame containing the LCAS packet for MFI1=7 and stays high until software reads the marker. It repeats every 2 milliseconds (16 frames). The hardware MFI counter 203 (90 in FIG. 3) is read and synchronized with the MFI2 by the software at 204. The hardware MFI counter is a free running 12-bit counter that increments once per frame when H4 is inserted. The 8 MSBs are used as MFI2 and the 4 LSBs are used as the MFI1. The same MFI value is used for all the transmit side LCAS enabled members. As the members travel through the network and experience differential delay, they will arrive at the sink with different MFI numbers which will be used to put them back in order.

The member numbers for which MST values need to be inserted in a given LCAS packet depends on the MFI2 number carried in that packet (see G.7042). Since the MFI value is inserted by the hardware (90 in FIG. 3), software therefore needs to know the MFI2 number being used by the hardware in order to identify the members for which it needs to write the MST in a given LCAS processing cycle. This synchronization with hardware is enabled by keeping the MFI2 in the control/status registers (96 in FIG. 3) readable by software.

LCAS processing for each member in an LCAS enabled VCG is carried out in the SW as per G.7042 at 205. The tasks involve running the LCAS state machine for each member, identifying if the sequence needs a change in the transmit direction, and maintaining the status of the member. If a sequence needs a change as determined by software, the software writes the new sequence (for all members) at 206 to the hardware TSI table 207 (98 in FIG. 3). The TSI table 207 (98 in FIG. 3) is a two page table maintained in hardware, one table for each VCG. The hardware uses one page (e.g. page 0) while the software writes to the other page (e.g. page 1).

At 206 the software writes the Tx_SwitchTSI flag for the VCG that was just changed. This indicates to the hardware that the 0 and 1 pages should be switched at the next LCAS packet boundary (i.e. hardware uses 1 and software uses 0). When the hardware reads the TSI page, it clears the Tx_SwitchTSI flag.

As a result of the LCAS processing, the software updates the LCAS packet (transmit control packet shown in FIG. 5) for each of the LCAS enabled members at 209 and stores (58 in FIG. 2) it in a hardware register Tx_LCAS_Pkt at 210 (100 in FIG. 3). The register Tx_LCAS_Pkt is a two page register, one register for each VCG member. One page (e.g. 0) is read by hardware while the other page (e.g. 1) is written by software.

At 211, the hardware inserts the LCAS packet provided by the software into the data path (at 102, 104, 106 in FIG. 3). Depending on the value of CTRL in a given LCAS packet, the hardware will assert or de-assert enable to mapper for that member at the boundary of the next frame starting with the next LCAS packet interval (as required by G.7042). This is a time critical part to achieve a hitless bandwidth change. It is handled completely in hardware to make the partitioning robust and avoid imposing stringent latency requirements on the processor running the LCAS software.

After writing the Tx LCAS Packet for members of a VCG at 209, the software sets Tx_SwitchPacket for that VCG at 212 (in registers 96 in FIG. 3). At the next new packet marker, hardware checks this Tx_SwitchPacket flag (in registers 96 in FIG. 3) to know if an updated LCAS packet is available (in register 100 in FIG. 3). Hardware switches Tx LCAS Packet page(at 92 in FIG. 3) at the start of the next LCAS packet only if this Tx_SwitchPacket flag was set.

If Tx_SwitchPacket is not set for a VCG when NewPkt-Marker occurs, the Tx_PktWrErr flag is set for that VCG at 213 by software (in registers 96 in FIG. 3) and Tx_PktWr-ErrCount is incremented (in registers 96 in FIG. 3). The Tx_PktWrErrCount counter is saturating type, i.e. counts to a maximum value then stays locked at that value until it is read. If the LCAS packet page (100 in FIG. 3) is not switched, hardware inserts the old LCAS packet but with CRC bits inverted. This causes the other node to ignore this LCAS packet (i.e. maintain the previous state) thus not corrupting the LCAS protocol. This feature enables implementation of the software part of the design in high latency systems where software may not complete the processing within one LCAS packet interval. The LCAS protocol will work correctly in such a scenario (because the information to switch can wait for the next control packet) though at a degraded performance.

At 214 the hardware reads the TSI page (98 in FIG. 3) and performs Seq. Change (104 in FIG. 3) as needed. The CRC is calculated at 215 in hardware (94 in FIG. 3) by reading the LCAS Pkt page (100 in FIG. 3). In an LCAS interval where LCAS packet update from software is not available, CRC values are inverted before inserting the CRC in the LCAS packet. This ensures that the LCAS protocol is not corrupted and the other node maintains its existing state.

At 216 the GID is generated in hardware (86 in FIG. 3). The same bit is inserted across all the members of a VCG. Delayed values of the PRBS are inserted in different VCGs (Delay=VCG ID) so that values across different VCGs are not identical.

At 217 LCAS bytes (H4) are inserted in the data path by the hardware (102 in FIG. 3). As described above, some of the fields are maintained in the hardware (CRC, MFI, and GID) while other fields are as written by the software. Hooks are provided for software to over-ride the CRC and GID insertion in hardware.

Figure 7:
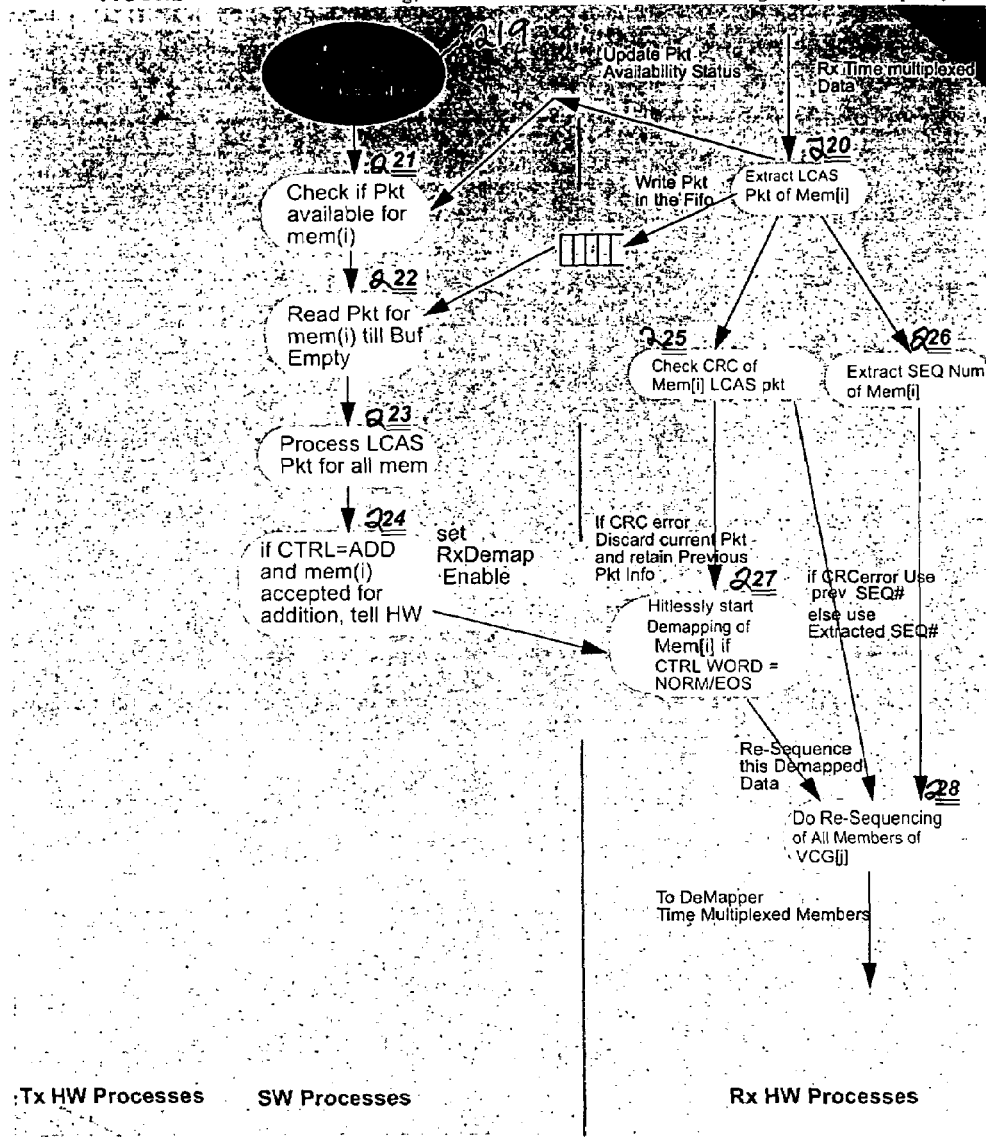
FIG. 7 is a high level flow chart illustrating the concurrent processes performed by hardware and software on the SONET receive side of the SONET PHY layer device.

At 218 the software turns to receive LCAS packet processing. FIG. 7 illustrates the hardware and software receive LCAS packet processing with software processes on the left and hardware processes on the right. The software process starts at 219. At 220 the hardware extracts the LCAS control packet (72, 74, 76 in FIG. 3) from the demapper and writes the packet in the FIFO (78 in FIG. 3). More particularly, the hardware identifies the LCAS Byte (H4) for each member of the LCAS enabled VCG. It extracts the H4 Bytes (72 in FIG. 3), packetizes (76 in FIG. 3) the LCAS Control packet in the format shown in FIG. 4, and checks if there is space available in the Rx Packet FIFO (78 in FIG. 3) for one complete packet. As described above, the last word of the control packet contains additional information relevant for that packet/member. The packet is pushed into the FIFO only if space is available; else the new packet is dropped. In a high latency system (e.g. using an external Host instead of an embedded processor) where the software can't read out packets fast enough, the old state is maintained for the members due to packet drop. When an LCAS packet is dropped for a member, Rx_Overflow_error flag is asserted (in registers 80 in FIG. 3) for that member and Rx_OverflowErrCount is incremented (in registers 80 in FIG. 3). Whenever a complete packet is available in the FIFO for a member, corresponding bit in Rx_PktAvailable is set by the hardware (in registers 80 in FIG. 3).

The software checks at 221 whether the FIFO (78 in FIG. 3) contains a packet (Rx_PktAvailable is set in registers 80 in FIG. 3) and reads the packet from the FIFO at 222. More particularly, LCAS packets are read for the members for which Rx_PktAvailable is set. Packets for a member (the four packet pipeline) are read until no further packets are available in the FIFO for that member. This ensures that Packet build-up in the FIFO for any reason (start-up conditions, configurations changes etc.) is avoided. The SOFTWARE also has a hook to clear FIFOs for all the members of a VCG by asserting Rx_PktAdrReset (in registers 80 in FIG. 3) for that VCG.

At 223, LCAS processing per G.7042 is carried out in the software. More particularly, LCAS state machines are run and necessary status is maintained. GID processing (e.g. consistency check that all the members of the VCG have identical GID bit) can also be done in the software.

At 224, if software sees CTRL=ADD for a member and it is going to send MST-OK for that member, it sets Rx_DemapEnable (in registers 80 in FIG. 3) for that member. Similarly, when a member is removed or goes to DNU, Rx_DemapEnable is removed. There is no time criticality involved in this signaling since hardware is signaled before proceeding further with the LCAS protocol with the remote node.

At 225 hardware performs CRC Check (74 in FIG. 3) on the received LCAS packet. In case of CRC error, the packet is not dropped but CRC status indication is passed on to software in Word(2) of the LCAS packet (formed at 76 in FIG. 3). Under normal operation, software will ignore the packets with CRC error. However, not dropping the packets in the hardware provides hooks for debug facilities that can be implemented in the software. Also at 226, the hardware extracts sequence numbers (82 in FIG. 3) from the LCAS packets.

At 227 the hardware starts to control demapping (via bandwidth change at 84 in FIG. 3). For a member for which Rx_DemapEnable has been asserted by software, the hardware checks the CTRL it receives. If CTRL=NORM/EOS, the corresponding slot carries the data to the Demapper block. Otherwise, that slot is considered not to carry valid data. Making the decision in the hardware removes the time criticality. Note also that CTRL in the packet is looked at only if the CRC for the packet is correct (at 74 in FIG. 3). Finally at 228, alignment per the extracted Sequence Numbers is carried out in the hardware (at 82 in FIG. 3). If the packet has a CRC Error, the existing Sequence number is used for data alignment.

There have been described and illustrated herein methods and apparatus for implementing LCAS in a combination of hardware and software. While particular embodiments of the invention have been described, it is not intended that the invention be limited thereto, as it is intended that the invention be as broad in scope as the art will allow and that the specification be read likewise. Thus, while the description refers to H4 based LCAS processing for High Order or Low-Order TU3 containers, the hardware-software interface and the partitioning of processes can be applicable to other types of containers as well. For example, and not by way of limitation, the LCAS processing of the invention can be applied to LCAS implementations in DS3 and DS1/E1 signals. Although the hardware and software have been described as implemented in cell logic, C language, and an Xtensa processor, other implementations are possible. It will therefore be appreciated by those skilled in the art that yet other modifications could be made to the provided invention without deviating from its spirit and scope as claimed.

What is claimed is:

1. A method for implementing Link Capacity Adjustment Scheme (LCAS) in an end node of a communications network, comprising:
   in the end node
      implementing the LCAS handshaking in software;
      implementing the link capacity adjustment in hardware; and
      interfacing the hardware and the software via a shared memory, wherein the shared memory includes a receive packet FIFO, receive control and status registers, a transmit packet FIFO, transmit control and status registers, and a transmit time slot interchange table.

2. The method according to claim 1, wherein:
   said receive control and status registers include
      receive packet available, receive overflow error, receive overflow error count, receive demap enable, and
   said transmit control and status registers include
      new packet marker, transmit packet write error, and transmit packet write error count.

3. The method according to claim 2, wherein:
   the new packet marker begins a two millisecond timer.

4. The method according to claim 2, wherein:
   the hardware identifies the LCAS H4 byte for each member of an LCAS enabled VCG, extracts the H4 bytes, packetizes the LCAS control packet, and checks the receive packet FIFO to see if there is enough room to store the LCAS control packet.

5. The method according to claim 4, wherein:
   if there is not enough room in the receive packet FIFO, the hardware drops the LCAS control packet, sets the receive overflow error flag, and increments the receive overflow error count.

6. The method according to claim 5, wherein:
   if there is enough room in the receive packet FIFO, the hardware writes the LCAS control packet to the receive packet FIFO, sets the receive overflow error flag, and sets a bit in the receive packet available register.

7. The method according to claim 6, wherein:
   the software reads packets from the receive packet FIFO according to the receive packet available register, and sets the receive demap enable register according to the contents of the LCAS control packet.

8. The method according to claim 1, wherein:
   the hardware accumulates bytes of a receive side LCAS control packet and writes the receive side LCAS control packet to shared memory,
   the software causes a processor to read the receive side LCAS control packet from shared memory, process the receive side LCAS control packet, and write the results of processing to shared memory, and
   the hardware reads the results of processing from shared memory and effects the link capacity adjustment.

9. The method according to claim 8, wherein:
   the hardware writes a transmit side LCAS control packet.

10. The method according to claim 9, wherein:
the hardware checks receive side CRC and calculates transmit side CRC.

11. An apparatus for implementing Link Capacity Adjustment Scheme (LCAS) in an end node of a communications network, comprising:
   circuitry for extracting H4 bytes and assembling receive side LCAS control packets;
   a processor for executing software, the software for causing said processor to process the receive side LCAS control packets and form LCAS transmit control packets;
   hardware for implementing the link capacity adjustment; and
   shared memory coupling the hardware and software, wherein the shared memory includes a receive packet FIFO, receive control and status registers, a transmit packet FIFO, transmit control and status registers, and a transmit time slot interchange table.

12. The apparatus according to claim 11, wherein:
said receive control and status registers include
   receive packet available, receive overflow error, receive overflow error count, receive demap enable, and
said transmit control and status registers include
   new packet marker, transmit packet write error, and transmit packet write error count.

* * * * *